US012792877B2

(12) United States Patent
Trilla Rodríguez et al.

(10) Patent No.: US 12,792,877 B2
(45) Date of Patent: Nov. 10, 2026

(54) MEMORY ADDRESS PREDICTION GENERATION

(71) Applicant: International Business Machines Corporation, Armonk, NY (US)

(72) Inventors: David Trilla Rodríguez, New York, NY (US); Alper Buyuktosunoglu, White Plains, NY (US); Ravi Nair, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 585 days.

(21) Appl. No.: 18/461,575

(22) Filed: Sep. 6, 2023

(65) Prior Publication Data

US 2025/0077836 A1 Mar. 6, 2025

(51) Int. Cl.

*G06N 3/0442* (2023.01)
*G06F 12/02* (2006.01)
*G06F 12/1009* (2016.01)

(52) U.S. Cl.

CPC ....... *G06N 3/0442* (2023.01); *G06F 12/0215* (2013.01); *G06F 12/1009* (2013.01)

(58) Field of Classification Search

CPC ...... G06N 3/0442; G06N 3/044; G06N 3/045; G06N 3/048; G06N 3/063; G06N 3/082; G06N 3/084; G06F 12/0215; G06F 12/1009

See application file for complete search history.

(56) References Cited

U.S. PATENT DOCUMENTS

| | | | | |
|---|---|---|---|---|
| 11,423,118 | B2 | 8/2022 | Shah et al. | |
| 11,556,992 | B2 | 1/2023 | Nguyen et al. | |
| 2020/0082253 | A1* | 3/2020 | Park | G06N 3/04 |
| 2022/0035629 | A1* | 2/2022 | Kwon | G06F 17/16 |
| 2022/0067509 | A1* | 3/2022 | Qin | G06V 10/82 |
| 2022/0300802 | A1* | 9/2022 | Torres | G06N 3/08 |
| 2022/0365525 | A1 | 11/2022 | Minisankar et al. | |

FOREIGN PATENT DOCUMENTS

| | | | | |
|---|---|---|---|---|
| CN | 113890622 A * | 1/2022 | | G06N 3/047 |
| EP | 3859535 B1 * | 2/2024 | | G06N 3/0464 |

OTHER PUBLICATIONS

Zhan Shi, Akanksha Jain, Kevin Swersky, Milad Hashemi, Parthasarathy Ranganathan, and Calvin Lin. Apr. 2021. A hierarchical neural model of data prefetching. In Proceedings of the 26th ACM International Conference on Architectural Support for Programming Languages and Operating Systems. (Year: 2021).*

(Continued)

*Primary Examiner* — Reginald G Bragdon
*Assistant Examiner* — Zakaria Mohammed Belkhayat
(74) *Attorney, Agent, or Firm* — Cantor Colburn LLP; Rakesh Roy

(57) ABSTRACT

Techniques are provided for memory address prediction. In one embodiment, the techniques involve receiving feature data, mapping the feature data to an input of a shift register, mapping an output of the shift register to a multiplexer, generating, via control of a selection line of the multiplexer, formatted feature data, segmenting the formatted feature data into bit groups, mapping the bit groups to corresponding embedding layers, and generating a vector based on the embedding layers.

20 Claims, 5 Drawing Sheets

(56) References Cited

OTHER PUBLICATIONS

Peled, L., Weiser, U., & Etsion, Y. (2019). A Neural Network Prefetcher for Arbitrary Memory Access Patterns. ACM Transactions on Architecture and Code Optimization, 16(4), 1â27. (Year: 2019).*
M. Lurbe, J. Feliu, S. Petit, M. E. Gómez and J. Sahuquillo, "DeepP: Deep Learning Multi-Program Prefetch Configuration for the IBM Power 8," in IEEE Transactions on Computers, vol. 71, No. 10, pp. 2646-2658, Oct. 1, 2022 (Year: 2022).*
Anonymous, "Compressed Sensing for Monitoring of an Application," IP.com, IPCOM000252103D, Dec. 15, 2017, 33 pages.
Anonymous, "Determining Priority Value of Processes Based on Usage History," IP.com, IPCOM000252344D, Jan. 5, 2018, 39 pages.
Anonymous, "Reinforcement Learning for Fuzzing Testing Techniques," IP.com, IPCOM000252021D, Dec. 13, 2017, 36 pages.
Azzouni et al., "A Long Short-Term Memory Recurrent Neural Network Framework for Network Traffic Matrix Prediction," arXiv:1705.05690v3, Jun. 8, 2017, 6 pages.
Hashemi et al., "Learning Memory Access Patterns," arXiv:1803.02329v1, Mar. 6, 2018, 15 pages.
Kouassi et al., "An analysis of deep neural networks for predicting trends in time series data," arXiv:2009.07943v2, Sep. 22, 2020, 23 pages.
Peled et al., "A neural network memory prefetcher using semantic locality," arXiv:1804.00478v2, Jul. 26, 2018, 13 pages.
Shi et al, "A Hierarchical Neural Model of Data Prefetching," Proceedings of the 26th ACM International Conference on Architectual Support for Programming Languages and Operating Systems, Apr. 19-23, 2021, 13 pages.
Shi et al., "A Neural Hierarchical Sequence Model for Irregular Data Prefetching," 33rd Conference on Neural Information Processing Systems, 2019, 5 pages.
Shi et al., "Applying Deep Learning to the Cache Replacement Problem," 52nd Annual IEEE/ACM International Symposium on Microarchitecture, Oct. 12-16, 2019, 14 pages.
Shin et al., "Predicting the Transition from Short-term to Long-term Memory based on Deep Neural Network," arXiv:2012.03510v1, Dec. 7, 2020, 6 pages.

* cited by examiner

MEMORY ADDRESS PREDICTION GENERATION

BACKGROUND

The present disclosure relates to data prefetching, and more specifically, to predicting memory addresses for data prefetching.

Traditional prefetching techniques use historical and running data usage patterns to identify data that is loaded into a cache or buffer memory before the data is required for processing. Preloading the data allows the traditional prefetching techniques to increase processing throughput, and reduce latency in comparison to accessing the data on demand from slower storage devices such as random-access memory or hard drive memory. However, these performance increases are limited by resource constraints (e.g., memory and processing cycles) that are impacted by the prefetching process, and by inaccurate predictions that waste resources on cache misses and cause further delays in data loading and data processing.

SUMMARY

A method is provided according to one embodiment of the present disclosure. The method includes receiving feature data; mapping the feature data to an input of a shift register; mapping an output of the shift register to a multiplexer; generating, via control of a selection line of the multiplexer, formatted feature data; segmenting the formatted feature data into bit groups; mapping the bit groups to corresponding embedding layers; and generating a vector based on the embedding layers.

A system is provided according to one embodiment of the present disclosure. The system includes a processor; and memory or storage comprising an algorithm or computer instructions, which when executed by the processor, performs an operation that includes: receiving feature data; mapping the feature data to an input of a shift register; mapping an output of the shift register to a multiplexer; generating, via control of a selection line of the multiplexer, formatted feature data; segmenting the formatted feature data into bit groups; mapping the bit groups to corresponding embedding layers; and generating a vector based on the embedding layers.

A computer-readable storage medium having computer-readable program code embodied therewith, the computer-readable program code executable by one or more computer processors to perform an operation, is provided according to one embodiment of the present disclosure. The operation includes receiving feature data; mapping the feature data to an input of a shift register; mapping an output of the shift register to a multiplexer; generating, via control of a selection line of the multiplexer, formatted feature data; segmenting the formatted feature data into bit groups; mapping the bit groups to corresponding embedding layers; and generating a vector based on the embedding layers.

DETAILED DESCRIPTION

Figure 1:
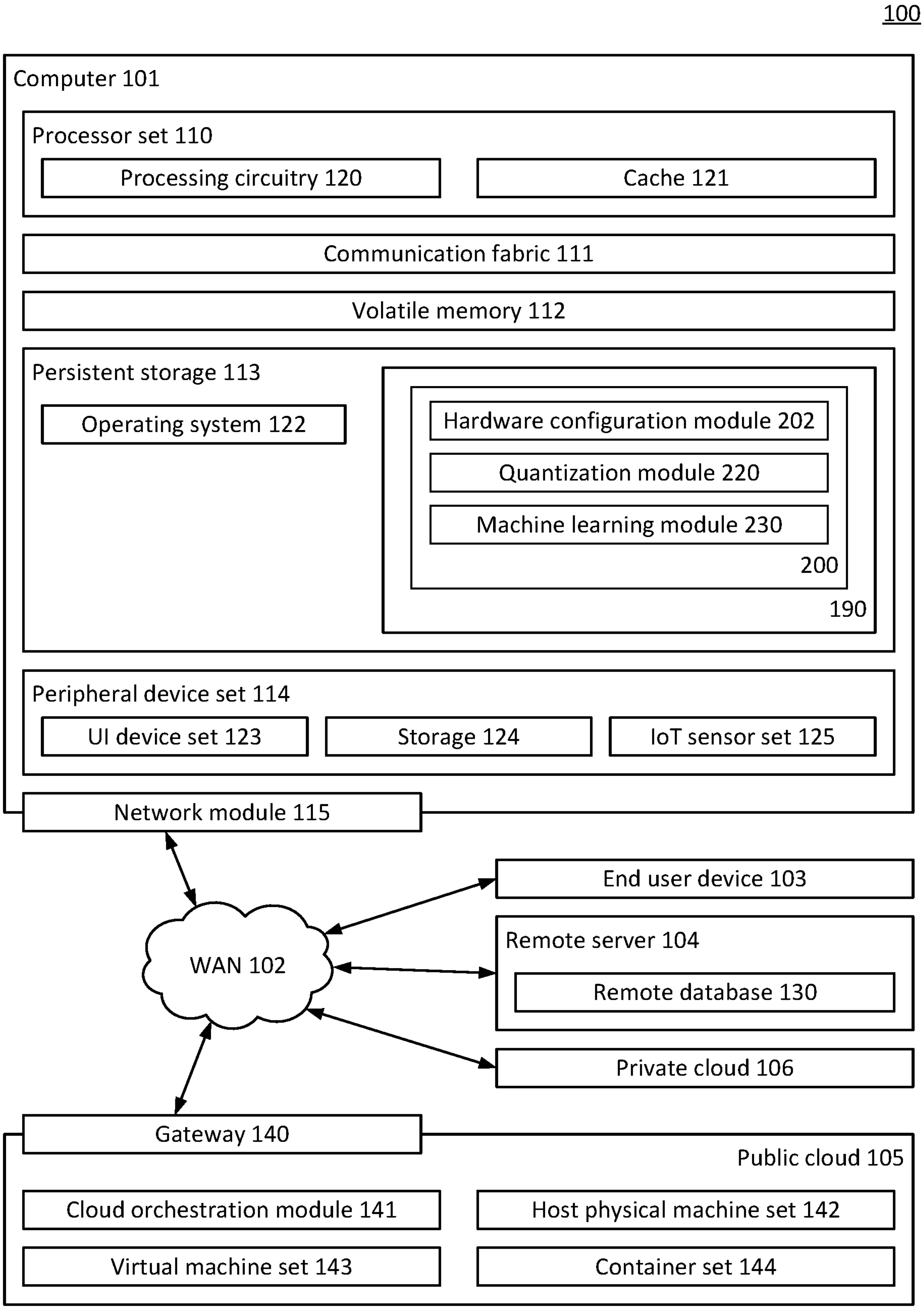
FIG. 1 illustrates a computing environment, according to one embodiment.

Embodiments of the present disclosure improve upon prefetching algorithms by providing a memory address prediction (MAP) module that predicts addresses for data prefetching or instruction prefetching. In one embodiment, the MAP module determines a configuration of shift registers based on prefetching feature data. The configuration can be used to generate formatted feature data, which includes attributes of the prefetching feature data and a configurable bit group size, for a machine learning model. Afterwards, the MAP module can segment the formatted feature data to generate corresponding bit groups, and map the bit groups to corresponding embedding layers, to generate an input vector for a set of neural network layers. The MAP module can then use outputs of the set of neural network layers to predict the memory addresses of the potential prefetching data.

One benefit of the disclosed embodiments is to allow for scalable prefetching processes for large memory input and output spaces by enabling hardware reconfiguration and configurable bit groupings to control inputs to machine learning models used to predict the addresses of the potential prefetching data. Further, embodiments of the present disclosure can accurately predict addresses to be used for prefetching data, thereby reducing the number of cache misses, and freeing resources to perform other computing tasks. Further, embodiments of the present disclosure segment inputs of the machine learning models into bit groups that cover the size of the inputs, thereby obviating the need for profiling the inputs/workloads, thereby allowing fully online operation without dependence on offline profiling techniques.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 illustrates a computing environment 100, according to one embodiment. Computing environment 100 contains an example of an environment for the execution of at least some of the computer code involved in performing the inventive methods, such as a new memory address prediction module 200, which includes a hardware configuration module 202, a quantization module 220, and a machine learning module 230, as shown in block 190. In addition to block 190, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 190, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 190 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in block 190 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
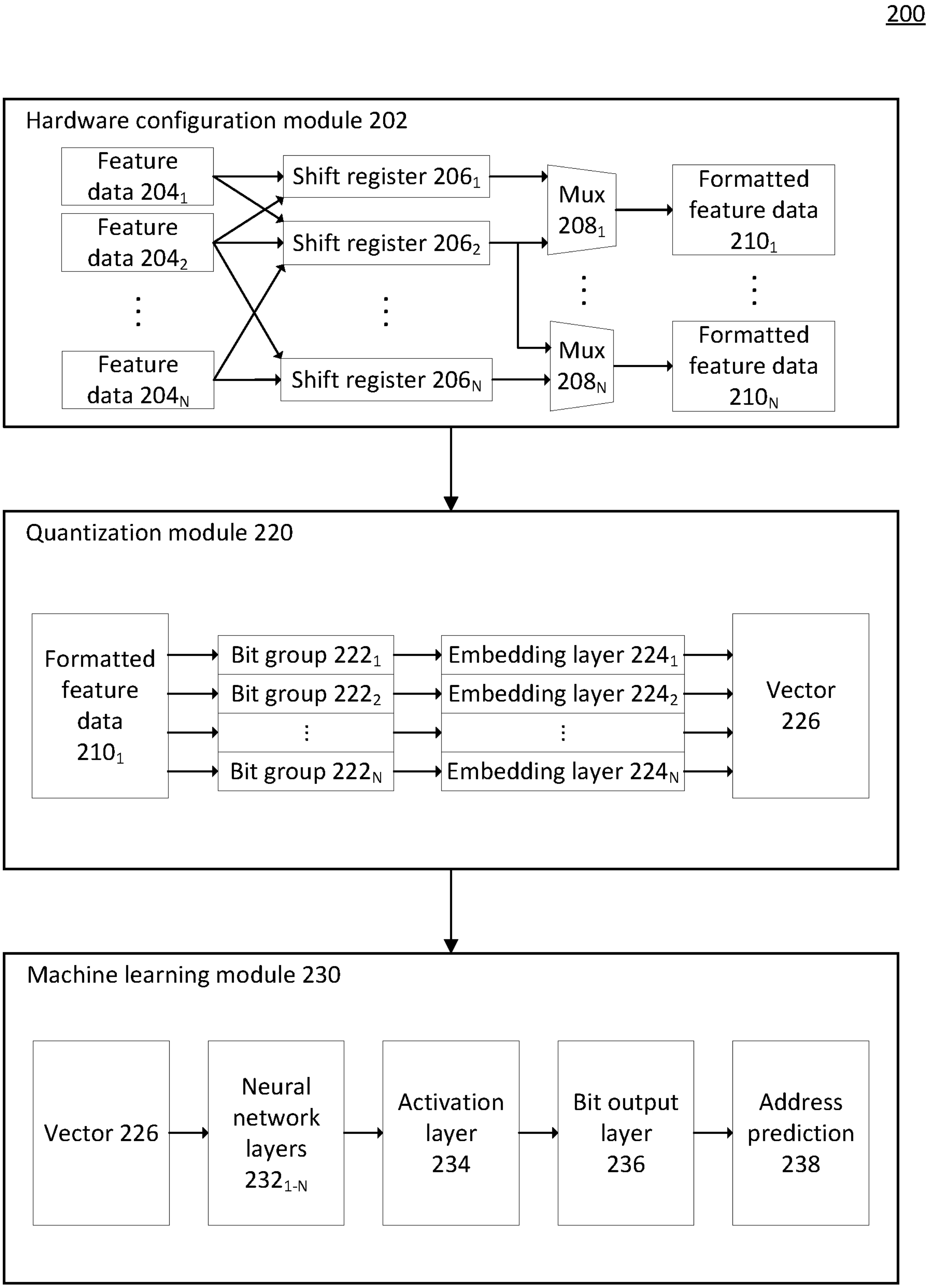
FIG. 2 illustrates a memory address prediction module, according to one embodiment.

FIG. 2 illustrates a memory address prediction (MAP) module 200, according to one embodiment. In the illustrated embodiment, the MAP module 200 includes a hardware configuration module 202, a quantization module 220, and a machine learning module 230.

As previously discussed, the persistent storage 113 can include the MAP module 200. In one embodiment, the MAP module 200 (and modules included therein) represent one or more algorithms, instruction sets, software applications, or other computer-readable program code that can be executed by the processor set 110 to perform the functions, operations, or processes described herein.

In the illustrated embodiment, the hardware configuration module 202 is configured to control mappings of features of prefetching data to computer hardware and software that controls the data of the features, and bit grouping sizes, that are included in inputs generated for the quantization module 220. The hardware configuration module 202 can include feature data $\mathbf{204}_{1\text{-}N}$, shift registers $\mathbf{206}_{1\text{-}N}$, multiplexers $\mathbf{208}_{1\text{-}N}$, and formatted feature data $\mathbf{210}_{1\text{-}N}$.

In one embodiment, the feature data $\mathbf{204}_{1\text{-}N}$ represents recent computer architecture information associated with prefetching techniques. Examples of the feature data $\mathbf{204}_{1\text{-}N}$ include an instruction address, a data address, a page number of a data address, a page offset, a memory line (i.e., a memory address at a cache line boundary of a data address), a last miss page number, a last miss page offset, a last miss memory line (i.e., a memory address at a cache line boundary of the last data address that was a miss), an L1 cache index, a L2 cache index, a page offset cache-line, a bit indicator of a cache miss, a bit indicator of a cache hit, or the like.

The feature data $\mathbf{204}_{1\text{-}N}$ can be mapped to at least one of the shift registers $\mathbf{206}_{1\text{-}N}$, and data of a combination of the shift registers $\mathbf{206}_{1\text{-}N}$ can be input into the multiplexers $\mathbf{208}_{1\text{-}N}$. The hardware configuration module 202 can control select lines of the multiplexers $\mathbf{208}_{1\text{-}N}$ to generate the formatted feature data $\mathbf{210}_{1\text{-}N}$. In one embodiment, the formatted feature data $\mathbf{210}_{1\text{-}N}$ conforms to bit groups and data determined by the hardware configuration module 202. These processes are discussed further in FIG. 3.

In the illustrated embodiment, the quantization module 220 is configured to segment the formatted feature data $\mathbf{210}_{1\text{-}N}$ to generate input vectors of the machine learning module 230. The quantization module 220 can include the formatted feature data $\mathbf{210}_{1\text{-}N}$, bit groups $\mathbf{222}_{1\text{-}N}$, embedding layers $\mathbf{224}_{1\text{-}N}$, and a vector 226.

In one embodiment, the quantization module 220 receives the formatted feature data $\mathbf{210}_{1}$ from the hardware configuration module 202, and segments the formatted feature data into $\mathbf{210}_{1}$ into bit groups $\mathbf{222}_{1\text{-}N}$ and embedding layers $\mathbf{224}_{1\text{-}N}$. The output of the embedding layers $\mathbf{224}_{1\text{-}N}$ can be concatenated to form the vector 226 that is input into the machine learning module 230. These processes are discussed further in FIG. 4.

In the illustrated embodiment, the machine learning module 230 is configured to generate a prediction of addresses used for prefetching. The machine learning module 230 can include the vector 226, neural network layers $\mathbf{232}_{1\text{-}N}$, an activation layer 234, a bit output layer 236, and an address prediction 238.

In one embodiment, the neural network layers $\mathbf{232}_{1\text{-}N}$ include multiple long short-term memory layers, a fully connected layer, a dropout layer, and the like. The vector 226 can be processed by the neural network layers $\mathbf{232}_{1\text{-}N}$, and input into the activation layer 234. The activation layer 234 can apply an activation function to normalize the output of neural network layers $\mathbf{232}_{1\text{-}N}$. In one embodiment, the activation function is a sigmoid function which normalizes the outputs between 0 and 1. These outputs can be input into the bit output layer (an interpretation layer), which is used to determine bits of an address prediction 238. This process is described further in FIG. 5.

Figure 3:
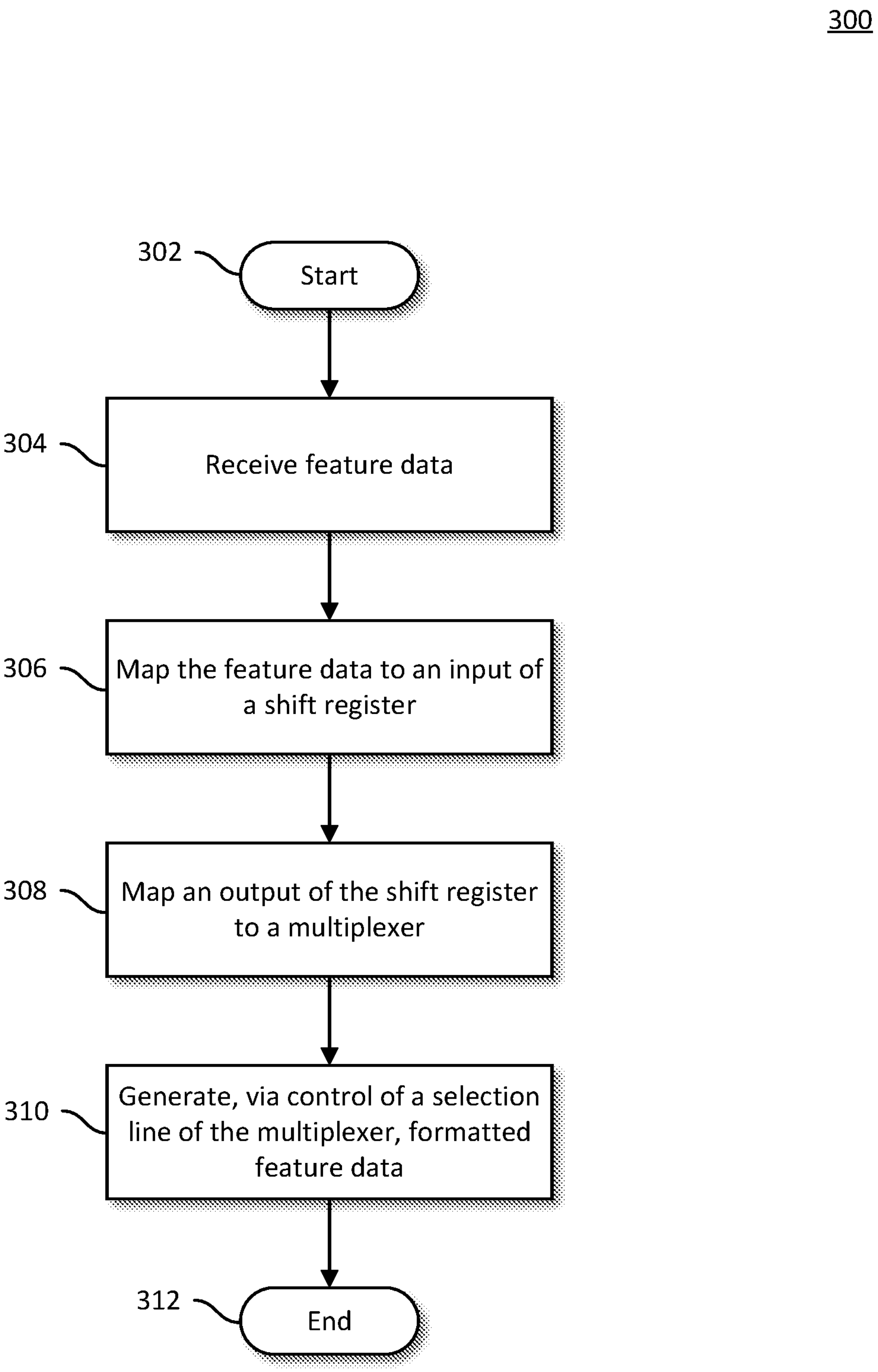
FIG. 3 illustrates a flowchart of a method of generating formatted feature data, according to one embodiment.

FIG. 3 illustrates a flowchart of a method 300 of generating formatted feature data, according to one embodiment. In one embodiment, the method 300 is performed by the hardware configuration module 202 of the MAP module 200. The method 300 begins at block 302.

At block 304, the hardware configuration module 202 receives feature data $\mathbf{204}_{1\text{-}N}$. In one embodiment, a system monitor tracks real-time, computer architecture information associated with prefetching techniques. The system monitor can transfer this information to the hardware configuration module 202 as the feature data $\mathbf{204}_{1\text{-}N}$. Examples of the feature data $\mathbf{204}_{1\text{-}N}$ include an instruction address, a data address, a page number of a data address, a page offset, a memory line (i.e., a memory address at a cache line boundary of a data address), a last miss page number, a last miss page offset, a last miss memory line (i.e., a memory address at a cache line boundary of the last data address that was a miss), an L1 cache index, a L2 cache index, a page offset cache-line, a bit indicator of a cache miss, a bit indicator of a cache hit, or the like.

At block 306, the hardware configuration module 202 maps the feature data $\mathbf{204}_{1\text{-}N}$ to an input of a shift register. In one embodiment, a shift register represents a computing circuit that is used to perform bit-wise storage, manipulation, and transfer of data using serial, or parallel, inputs or outputs.

In one embodiment, mappings between the feature data $\mathbf{204}_{1\text{-}N}$ and the shift registers $\mathbf{206}_{1\text{-}N}$ are predetermined. The predetermined mappings can be determined by subject matter experts, and encoded into the hardware configuration module 202. In another embodiment, mappings between the feature data $\mathbf{204}_{1\text{-}N}$ and the shift registers $\mathbf{206}_{1\text{-}N}$ are configurable via a user interface or a code base that allows a user to determine attributes of the feature data $\mathbf{204}_{1\text{-}N}$ that are mapped to one or more of the shift registers $\mathbf{206}_{1\text{-}N}$.

At block 308, the hardware configuration module 202 maps an output of the shift register to a multiplexer. The output of each of the shift registers $\mathbf{206}_{1\text{-}N}$ can be used as an input to at least one of the multiplexers $\mathbf{208}_{1\text{-}N}$.

In one embodiment, the mappings between the shift registers $\mathbf{206}_{1\text{-}N}$ and the multiplexers $\mathbf{208}_{1\text{-}N}$ are predetermined. The predetermined mappings can be determined by subject matter experts, and encoded into the hardware configuration module 202. In another embodiment, mappings between the shift registers $\mathbf{206}_{1\text{-}N}$ and the multiplexers $\mathbf{208}_{1\text{-}N}$ are configurable via a user interface or a code base that allows a user to determine a combination of attributes of the feature data $\mathbf{204}_{1\text{-}N}$ that can be selected as formatted feature data $\mathbf{210}_{1\text{-}N}$.

At block 310, the hardware configuration module 202 generates, via control of a selection line of the multiplexer, formatted feature data $\mathbf{210}_{1\text{-}N}$. In this manner, the hardware configuration module 202 can control the attributes of feature data $204_{1-N}$, and size of bit groups, included in formatted feature data $210_{1-N}$ output from the multiplexers $210_{1-N}$. In one embodiment, the formatted feature data $210_{1-N}$ represents feature inputs of a machine learning model. The method 300 ends at block 312.

Figure 4:
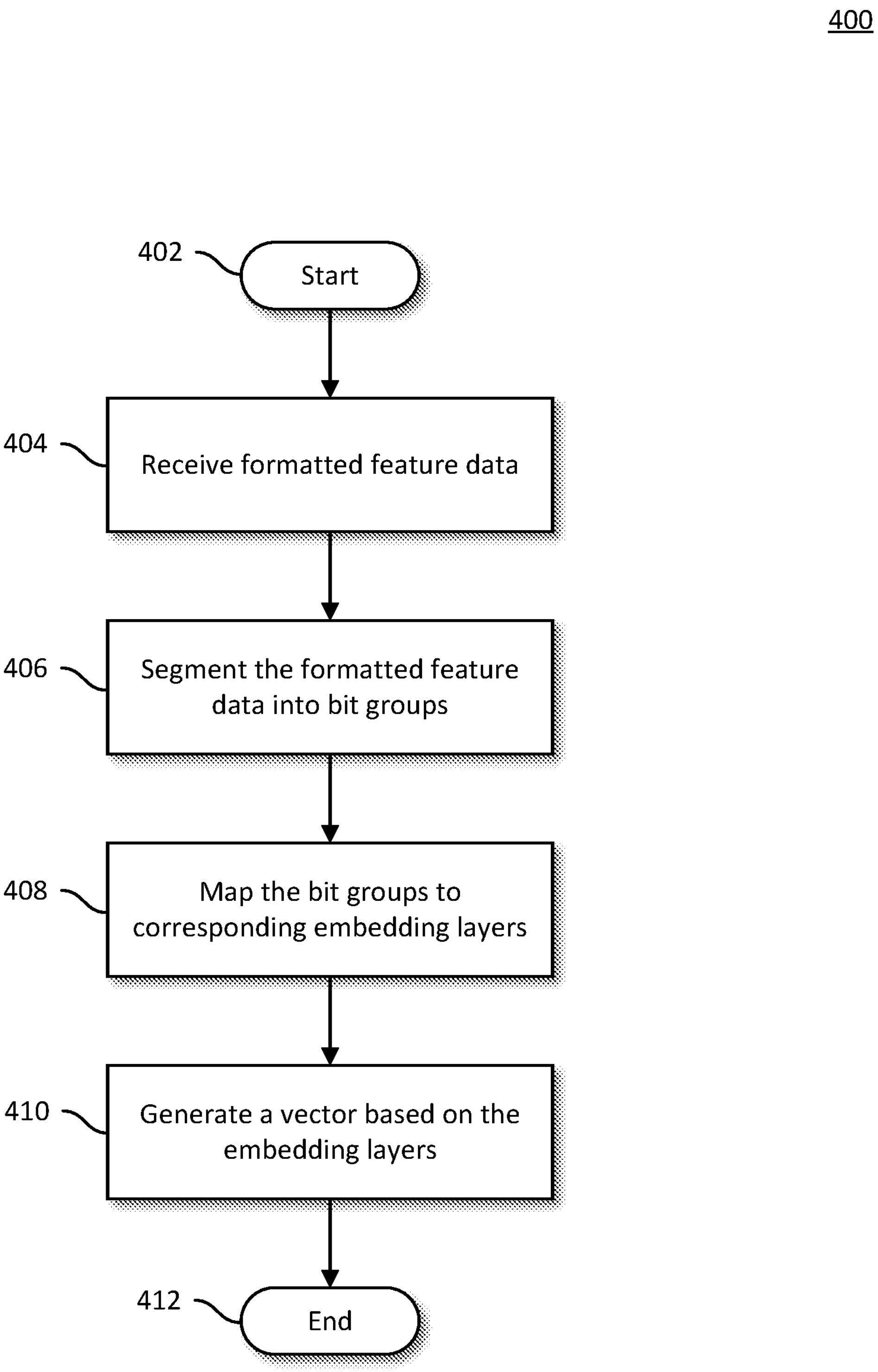
FIG. 4 illustrates a flowchart of a method of generating a vector, according to one embodiment.

FIG. 4 illustrates a flowchart of a method 400 of generating a vector, according to one embodiment. In one embodiment, the method 400 is performed by the quantization module 220 of the MAP module 200. The quantization module 220 may be representative of a machine learning model that learns to identify bit groups $222_{1-N}$ that are correlated with accurate address predictions. The method begins at block 402.

At block 404, the quantization module 220 receives formatted feature data $210_1$. In one embodiment, the formatted feature data $210_1$ represents a collection of bit integers. In the embodiment illustrated in FIG. 2, operations on one formatted feature data $210_1$ are shown. However, each of the formatted feature data $210_{1-N}$ can be used to generate respective vectors and address predictions by performing processes similar to those described herein.

At block 406, the quantization module 220 segments the formatted feature data $210_1$ into bit groups $222_{1-N}$. In one embodiment, the bit groups $222_{1-N}$ represent a sequence of bits that correspond to sections or portions of addresses and attributes of the feature data $204_{1-N}$.

The formatted feature data $210_1$ can be segmented into as many bit groups $222_{1-N}$ as needed to include all information of the formatted feature data $210_1$. As previously discussed, the formatted feature data $210_1$ can conform to a bit group size determined by the hardware configuration module 202. For example, the formatted feature data $210_1$ may include 64 bits, which allows the formatted feature data $210_1$ to be segmented into four bit groups that each include 16 bits.

One benefit to segmenting the formatted feature data $210_1$ into bit groups $222_{1-N}$ is to enable scalable address predictions across large input spaces (i.e., large formatted feature data $210_{1-N}$) by providing manageable segments of the formatted feature data $210_1$ that can be learned at the embedding layers $224_{1-N}$.

At block 408, the quantization module 220 maps the bit groups $222_{1-N}$ to corresponding embedding layers. In one embodiment, an embedding layer represents a machine learning layer that transforms the bit groups $222_{1-N}$ into machine learnable formats. Each of the embedding layers $224_{1-N}$ can include data and weights that correspond to a respective bit group. The weights of the embedding layers $224_{1-N}$ can be updated during training to identify which bit groups $222_{1-N}$ are correlated to accurate address predictions.

At block 410, the quantization module 220 generates a vector 226 based on the embedding layers $224_{1-N}$. For instance, the embedding layers $224_{1-N}$ can be concatenated, or otherwise aggregated, to generate the vector 226 such that the output of each of the embedding layers $224_{1-N}$ represents one or more elements of the vector 226. The method 400 ends at block 412.

Figure 5:
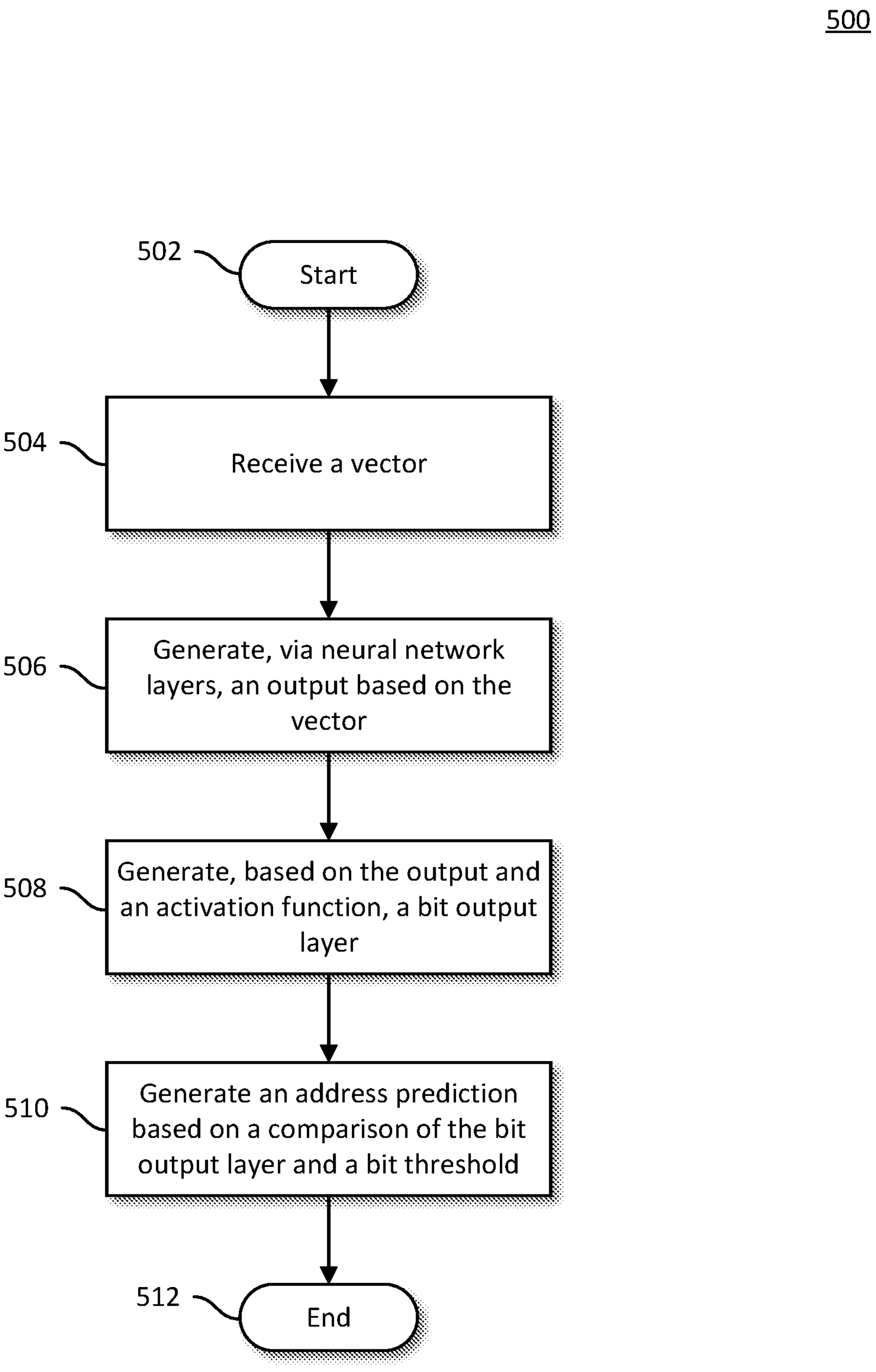
FIG. 5 illustrates a flowchart of a method of generating an address prediction, according to one embodiment.

FIG. 5 illustrates a flowchart of a method 500 of generating an address prediction 238, according to one embodiment. In one embodiment, the method 500 is performed by the machine learning module 230 of the MAP module 200. The method 500 begins at block 502.

At block 504, the machine learning module 230 receives a vector 226. As previously discussed, each element or group of elements of the vector 226 can represent an embedding layer $224_{1-N}$.

At block 506, the machine learning module 230 generates, via neural network layers $232_{1-N}$, an output based on the vector 226. In one embodiment, the neural network layers $232_{1-N}$ include long short-term memory (LSTM) layers, a fully connected layer, a dropout layer, and the like.

The LSTM layers can include memory cells and gates that store, update, or output bit sequence information (based on the vector 226 input) over multiple time steps. The fully connected layer can connect each neuron of the fully connected layer to a neuron of a following layer. In one embodiment, the fully connected layer precedes a dropout layer. The dropout layer can randomly set neuron inputs to zero during training to reduce co-dependencies between neurons of the neural network layers $232_{1-N}$.

At block 508, the machine learning module 230 generates, based on the output and an activation function, a bit output layer 236. In one embodiment, outputs of the neural network layers $232_{1-N}$ are input into the activation layer 234, which applies an activation function to each neuron of the activation layer 234. The activation function may be a sigmoid function which normalizes the outputs of the neurons of the activation layer 234 to values between 0 and 1.

The outputs of the activation layer 234 can be input into the bit output layer 236. Therefore, the bit output layer 236 can include neurons with data values ranging from 0 to 1.

At block 510, the machine learning module 230 generates an address prediction 238 based on a comparison of the bit output layer 236 and a bit threshold. The address prediction 238 can represent an address used for data prefetching, instruction prefetching, or the like. In one embodiment, the number of neurons in the bit output layer 236 is equal to the number of bits of the address prediction 238.

The machine learning module 230 can convert the data values of the neurons of the bit output layer 236 into binary outputs by comparing the data values to the bit threshold. In one embodiment, when the activation function is a sigmoid function (which normalizes outputs to values between 0 and 1), the bit threshold is set to a value of 0.5.

In one embodiment, upon determining that a data value of a neuron of the bit output layer 236 exceeds the bit threshold, the machine learning module 230 can map the data value to a binary output of 1. However, upon determining that a data value of a neuron of the bit output layer 236 does not exceed the bit threshold, the machine learning module 230 can map the data value to a binary output of 0.

In this manner, the machine learning module 230 determines a binary value for each data value of the bit output layer 236, which can be concatenated to generate the address prediction 238. The address prediction 238 can represent addresses associated with prefetching features. For instance, an address prediction 238 may represent a page address and a 64-bit page offset, or may represent a 56-bit memory line. The method 500 ends at block 512.

While the foregoing is directed to embodiments of the present invention, other and further embodiments of the invention may be devised without departing from the basic scope thereof, and the scope thereof is determined by the claims that follow.

What is claimed is:

1. A method comprising:

receiving feature data;

determining a bit group size;

mapping the feature data to an input of a shift register;

mapping an output of the shift register to a multiplexer;

generating, via control of a selection line of the multiplexer, formatted feature data that conforms to the bit group size;

segmenting the formatted feature data into bit groups;
mapping the bit groups to corresponding embedding layers; and
generating a vector based on the embedding layers.

2. The method of claim 1, further comprising:
generating, via neural network layers, an output based on the vector;
generating, based on the output and an activation function, a bit output layer; and
generating an address prediction based on a comparison of the bit output layer and a bit threshold, wherein the address prediction represents an address associated with prefetching.

3. The method of claim 2, wherein the activation function comprises a sigmoid function that normalizes data values of the bit output layer to values between 0 and 1, and wherein the bit threshold is set to a value of 0.5.

4. The method of claim 2, wherein upon determining that a data value of a first neuron of the bit output layer exceeds the bit threshold, the data value of the first neuron is mapped to a binary output of 1, and wherein upon determining that a data value of a second neuron of the bit output layer does not exceed the bit threshold, the data value of the second neuron is mapped to a binary output of 0.

5. The method of claim 2, wherein the neural networks layers include multiple long short-term memory layers, a fully connected layer, and a dropout layer.

6. The method of claim 1, wherein the feature data includes at least one of: an instruction address, a data address, a page number of a data address, a page offset, a memory line, a last miss page number, a last miss page offset, a last miss memory line, an L1 cache index, a L2 cache index, a page offset cache-line, a bit indicator of a cache miss, or a bit indicator of a cache hit.

7. The method of claim 1, wherein the mapping of the feature data to the input of the shift register is configurable by a user, wherein the mapping of the output of the shift register to the multiplexer is configurable by the user, and wherein configurations of the mappings by the user can be performed via a user interface or code base of a memory address prediction module.

8. A system, comprising:
a processor; and
memory or storage comprising an algorithm or computer instructions, which when executed by the processor, performs an operation comprising:
receiving feature data;
determining a bit group size;
mapping the feature data to an input of a shift register;
mapping an output of the shift register to a multiplexer;
generating, via control of a selection line of the multiplexer, formatted feature data that conforms to the bit group size;
segmenting the formatted feature data into bit groups;
mapping the bit groups to corresponding embedding layers; and
generating a vector based on the embedding layers.

9. The system of claim 8, the operation further comprising:
generating, via neural network layers, an output based on the vector;
generating, based on the output and an activation function, a bit output layer; and
generating an address prediction based on a comparison of the bit output layer and a bit threshold, wherein the address prediction represents an address associated with prefetching.

10. The system of claim 9, wherein the activation function comprises a sigmoid function that normalizes data values of the bit output layer to values between 0 and 1, and wherein the bit threshold is set to a value of 0.5.

11. The system of claim 9, wherein upon determining that a data value of a first neuron of the bit output layer exceeds the bit threshold, the data value of the first neuron is mapped to a binary output of 1, and wherein upon determining that a data value of a second neuron of the bit output layer does not exceed the bit threshold, the data value of the second neuron is mapped to a binary output of 0.

12. The system of claim 9, wherein the neural networks layers include multiple long short-term memory layers, a fully connected layer, and a dropout layer.

13. The system of claim 8, wherein the feature data includes at least one of:
an instruction address, a data address, a page number of a data address, a page offset, a memory line, a last miss page number, a last miss page offset, a last miss memory line, an L1 cache index, a L2 cache index, a page offset cache-line, a bit indicator of a cache miss, or a bit indicator of a cache hit.

14. The system of claim 8, wherein the mapping of the feature data to the input of the shift register is configurable by a user, wherein the mapping of the output of the shift register to the multiplexer is configurable by the user, and wherein configurations of the mappings by the user can be performed via a user interface or code base of a memory address prediction module.

15. A computer-readable storage medium having a computer-readable program code embodied therewith, the computer-readable program code executable by one or more computer processors to perform an operation comprising:
receiving feature data;
determining a bit group size;
mapping the feature data to an input of a shift register;
mapping an output of the shift register to a multiplexer;
generating, via control of a selection line of the multiplexer, formatted feature data that conforms to the bit group size;
segmenting the formatted feature data into bit groups;
mapping the bit groups to corresponding embedding layers; and
generating a vector based on the embedding layers.

16. The computer-readable storage medium of claim 15, the operation further comprising:
generating, via neural network layers, an output based on the vector;
generating, based on the output and an activation function, a bit output layer; and
generating an address prediction based on a comparison of the bit output layer and a bit threshold, wherein the address prediction represents an address associated with prefetching.

17. The computer-readable storage medium of claim 16, wherein the activation function comprises a sigmoid function that normalizes data values of the bit output layer to values between 0 and 1, and wherein the bit threshold is set to a value of 0.5.

18. The computer-readable storage medium of claim 16, wherein upon determining that a data value of a first neuron of the bit output layer exceeds the bit threshold, the data value of the first neuron is mapped to a binary output of 1, and wherein upon determining that a data value of a second neuron of the bit output layer does not exceed the bit threshold, the data value of the second neuron is mapped to a binary output of 0.

19. The computer-readable storage medium of claim 15, wherein the feature data includes at least one of: an instruction address, a data address, a page number of a data address, a page offset, a memory line, a last miss page number, a last miss page offset, a last miss memory line, an L1 cache index, a L2 cache index, a page offset cache-line, a bit indicator of a cache miss, or a bit indicator of a cache hit.

20. The computer-readable storage medium of claim 15, wherein the mapping of the feature data to the input of the shift register is configurable by a user, wherein the mapping of the output of the shift register to the multiplexer is configurable by the user, and wherein configurations of the mappings by the user can be performed via a user interface or code base of a memory address prediction module.

* * * * *